(12) United States Patent
Dickman et al.

(10) Patent No.: US 7,390,587 B2
(45) Date of Patent: Jun. 24, 2008

(54) FUEL CELL SYSTEM WITH LOAD MANAGEMENT

(75) Inventors: Anthony J. Dickman, Bend, OR (US); David J. Edlund, Bend, OR (US)

(73) Assignee: Idatech, LLC, Bend, OR (US)

( * ) Notice: Subject to any disclaimer, the term of this patent is extended or adjusted under 35 U.S.C. 154(b) by 583 days.

(21) Appl. No.: 11/004,487

(22) Filed: Dec. 3, 2004

(65) Prior Publication Data

US 2005/0084726 A1    Apr. 21, 2005

Related U.S. Application Data

(62) Division of application No. 09/815,180, filed on Mar. 22, 2001, now Pat. No. 6,835,481.

(60) Provisional application No. 60/193,052, filed on Mar. 29, 2000.

(51) Int. Cl.
  *H01M 8/10* (2006.01)
  *H01M 8/04* (2006.01)
  *H01M 8/18* (2006.01)
  *H01M 8/12* (2006.01)

(52) U.S. Cl. .............. 429/32; 429/19; 429/20; 429/21; 429/22

(58) Field of Classification Search ............ 429/9, 429/13, 17, 23, 19, 21, 7; 320/101, 102; 73/147; 701/22; 423/652; 700/286
See application file for complete search history.

(56) References Cited

U.S. PATENT DOCUMENTS 3,857,735 A   12/1974 Louis et al.
4,000,003 A   12/1976 Baker et al.

(Continued)

FOREIGN PATENT DOCUMENTS

CA      2317452      8/1999

(Continued)

OTHER PUBLICATIONS

English-language abstract of Japanese Unexamined Patent Application Publication No. SHO 62-17961, 1987.

(Continued)

*Primary Examiner*—Jonathan Crepeau
*Assistant Examiner*—R. Hodge
(74) *Attorney, Agent, or Firm*—Dascenzo Intellectual Property Law, P.C.

(57) ABSTRACT

A fuel cell system having partial and/or total redundancy of at least one operational component, such as a redundancy of fuel cell stacks and/or fuel processors. In some embodiments, the fuel cell system includes a plurality of fuel cell stacks adapted to deliver the same maximum rated power output as a comparative fuel cell system having only a single fuel cell stack. In some embodiments, the fuel cell system includes a plurality of fuel cell stacks adapted to deliver more than the maximum rated power output of the comparative fuel cell system. In some embodiments, the fuel cell system includes a plurality of fuel cell stacks having at least n+1 (or total) redundancy compared to a fuel cell system having only a single fuel cell stack. In some embodiments, the fuel cell system includes a control system and/or structure adapted to limit the applied load to the system.

55 Claims, 8 Drawing Sheets

U.S. PATENT DOCUMENTS

| | | |
|---|---|---|
| 4,098,959 A | 7/1978 | Fanciullo |
| 4,098,960 A | 7/1978 | Gagnon |
| 4,310,605 A | 1/1982 | Early et al. |
| 4,349,613 A | 9/1982 | Winsel |
| 4,351,405 A | 9/1982 | Fields et al. |
| 4,377,445 A | 3/1983 | Grimes |
| 4,390,602 A | 6/1983 | Struthers |
| 4,642,273 A | 2/1987 | Sasaki |
| 4,820,594 A | 4/1989 | Sugita et al. |
| 4,839,574 A | 6/1989 | Takabayashi |
| 4,883,724 A | 11/1989 | Yamamoto |
| 4,904,548 A | 2/1990 | Tajima |
| 4,988,283 A | 1/1991 | Nagasawa et al. |
| 5,006,846 A | 4/1991 | Granville et al. |
| 5,139,894 A | 8/1992 | Mizuno et al. |
| 5,154,986 A | 10/1992 | Takechi et al. |
| 5,229,222 A | 7/1993 | Tsutsumi et al. |
| 5,334,463 A | 8/1994 | Tajima et al. |
| 5,366,818 A | 11/1994 | Wilkinson et al. |
| 5,366,821 A | 11/1994 | Merrit et al. |
| 5,401,589 A | 3/1995 | Palmer et al. |
| 5,432,710 A | 7/1995 | Ishimaru et al. |
| 5,462,815 A * | 10/1995 | Horiuchi ............... 429/13 |
| 5,624,768 A * | 4/1997 | Tanokura ............... 429/23 |
| 5,631,532 A | 5/1997 | Azuma et al. |
| 5,637,414 A | 6/1997 | Inoue et al. |
| 5,658,681 A | 8/1997 | Sato et al. |
| 5,677,073 A | 10/1997 | Kawatsu |
| 5,709,961 A | 1/1998 | Cisar et al. |
| 5,712,052 A | 1/1998 | Kawatsu |
| 5,714,276 A * | 2/1998 | Okamoto ............... 429/17 |
| 5,763,113 A | 6/1998 | Meltser et al. |
| 5,771,476 A | 6/1998 | Mufford et al. |
| 5,795,666 A | 8/1998 | Johnssen |
| 5,798,186 A | 8/1998 | Fletcher et al. |
| 5,861,137 A | 1/1999 | Edlund |
| 5,880,677 A | 3/1999 | Lestician |
| 5,897,766 A | 4/1999 | Kawatsu |
| 5,927,416 A | 7/1999 | del Re et al. |
| 5,929,538 A | 7/1999 | O'Sullivan et al. |
| 5,964,309 A | 10/1999 | Kimura et al. |
| 5,985,474 A | 11/1999 | Chen et al. |
| 5,989,739 A | 11/1999 | Zur Megede et al. |
| 5,991,670 A | 11/1999 | Mufford et al. |
| 5,997,594 A | 12/1999 | Edlund et al. |
| 5,998,053 A | 12/1999 | Diethelm |
| 6,013,385 A | 1/2000 | DuBose |
| 6,045,772 A | 4/2000 | Szydlowski et al. |
| 6,045,933 A | 4/2000 | Okamoto |
| 6,083,637 A | 7/2000 | Walz et al. |
| 6,096,449 A | 8/2000 | Fuglevand et al. |
| 6,103,410 A | 8/2000 | Fuller et al. |
| 6,110,612 A * | 8/2000 | Walsh ............... 429/13 |
| 6,165,633 A | 12/2000 | Negishi |
| 6,214,484 B1 | 4/2001 | Hauer |
| 6,221,117 B1 | 4/2001 | Edlund et al. |
| 6,421,593 B1 | 7/2002 | Kempen et al. |
| 6,423,203 B1 | 7/2002 | Faita et al. |
| 6,458,477 B1 | 10/2002 | Hsu |
| 6,522,955 B1 | 2/2003 | Colborn |
| 6,537,690 B1 | 3/2003 | Karrupaiah et al. |
| 6,703,722 B2 | 3/2004 | Christensen |
| 6,764,782 B2 | 7/2004 | Raiser et al. |
| 2005/0119842 A1 | 6/2005 | Clingerman et al. |

FOREIGN PATENT DOCUMENTS

| | | |
|---|---|---|
| CA | 2276205 | 10/2002 |
| EP | 1065741 A2 | 1/2001 |
| JP | SHO 53-81923 | 7/1978 |
| JP | SHO 57-111963 | 7/1982 |
| JP | SHO 62-17961 | 1/1987 |
| JP | SHO 62-24570 | 2/1987 |
| JP | SHO 63-276878 | 11/1988 |
| JP | 02-168803 * | 7/1990 |
| JP | HEI 02-214910 | 8/1990 |
| JP | 4-163860 | 6/1992 |
| JP | HEI 09-117062 | 5/1997 |
| WO | WO 00/02282 | 1/2000 |

OTHER PUBLICATIONS

English-language abstract of Japanese Unexamined Patent Application Publication No. SHO 62-24570, 1987.
English-language abstract of Japanese Unexamined Patent Application Publication No. SHO 63-276878, 1988.
English-language abstract of Japanese Patent No. 4-163860, 1992.
English-language abstract of Japanese Unexamined Patent Application Publication No. HEI 09-117062, 1997.
English-language abstract of Japanese Unexamined Patent Application Publication No. HEI 02-214910, 1998.
English-language abstract of Japanese Patent No. JP 63-236269, 1999.
English-language abstract of Japanese Patent No. JP 2-168803, 1999.
Nadal, et al., "Development of a Hybrid Fuel Cell/Battery Powered Electric Vehicle," *International Journal of Hydrogen Energy*, vol. 21, No. 6, pp. 497-505, Jun. 1, 1996.

* cited by examiner

ёU S 7,390,587 B2

FUEL CELL SYSTEM WITH LOAD MANAGEMENT

RELATED APPLICATIONS

This application is a divisional patent application of and claims priority to U.S. patent application Ser. No. 09/815,180, which was filed on Mar. 22, 2001, issued on Dec. 28, 2004 as U.S. Pat. No. 6,835,481, and which claims priority to U.S. Provisional Patent Application Ser. No. 60/193,052, which was filed on Mar. 29, 2000, and is entitled "Fuel Cell System." The complete disclosures of the above-identified patent application are hereby incorporated by reference for all purposes.

FIELD OF THE INVENTION

The present invention relates generally to energy-production systems, and more particularly to fuel cell systems that include a plurality of fuel cell stacks.

BACKGROUND OF THE INVENTION

Fuel cell systems include a fuel processor and a fuel cell stack. The fuel cell stack produces an electric current from the product stream of the fuel processor. For example, the fuel processor may produce hydrogen gas or hydrogen-rich gas from common feed stocks, such as water, a carbon-containing feedstock, or both. The fuel cell stack produces an electric current from the hydrogen gas.

An example of a conventional fuel cell system is shown in FIG. 1 and indicated generally at 10. System 10 includes a fuel processing assembly 11 and a fuel cell stack 22. Fuel processing assembly 11 includes a suitable fuel processor 12 and a feed stream delivery system 17, which delivers a feed stream 16 to the fuel processor. Fuel processor 12 is adapted to produce a product hydrogen stream 14 containing hydrogen gas from feed stream 16, which contains the feedstock for the fuel processor.

The composition and number of individual streams forming feed stream 16 will tend to vary depending on the mechanism by which fuel processor 12 is adapted to produce product hydrogen stream 14. For example, if fuel processor 12 produces stream 14 by steam or autothermal reforming, feed stream 16 contains a carbon-containing feedstock 18 and water 20. If fuel processor 12 produces stream 14 by pyrolysis or catalytic partial oxidation of a carbon-containing feedstock, feed stream 16 contains a carbon-containing feedstock and does not include water. If fuel processor 12 produces stream 14 by electrolysis, feed stream 16 contains water and does not contain a carbon-containing feedstock. Examples of carbon-containing feedstocks include alcohols and hydrocarbons. When the feed stream contains water and a carbon-containing feedstock that is soluble with water, the feed stream may be a single stream, such as shown in FIG. 1. When the carbon-containing feedstock is not miscible in water, the water and carbon-containing feedstock are delivered in separate feed streams, such as shown in FIG. 2.

Fuel cell stack 22 is adapted to produce an electric current from the portion of product hydrogen stream 14 delivered thereto. Fuel cell stack 22 includes a plurality of fuel cells 24 integrated together between common end plates 23, which contain fluid delivery/removal conduits (not shown). Examples of conventional fuel cells include proton exchange membrane (PEM) fuel cells and alkaline fuel cells. Fuel cell stack 22 may receive all of product hydrogen stream 14. Some or all of stream 14 may additionally, or alternatively, be delivered, via a suitable conduit, for use in another hydrogen-consuming process, burned for fuel or heat, or stored for later use.

Fuel cell stack 22 receives at least a substantial portion of product hydrogen stream 14 and produces an electric current 26 therefrom. This current can be used to provide electrical power to an associated energy-consuming device 28, such as a vehicle or a house or other residential or commercial dwelling.

In FIG. 3, an illustrative example of a fuel cell stack is shown. Stack 22 (and the individual fuel cells 24 contained therein) includes an anode region 32 and a cathode region 34, which are separated by an electrolytic membrane or barrier 36 through which hydrogen ions may pass. The regions respectively include anode and cathode electrodes 38 and 40. The anode region 32 of the fuel cell stack receives at least a portion of product hydrogen stream 14. Anode region 32 is periodically purged, and releases a purge stream 48, which may contain hydrogen gas. Alternatively, hydrogen gas may be continuously vented from the anode region of the fuel cell stack and re-circulated. The purge streams may be vented to the atmosphere, combusted, used for heating, fuel or as a feedstock for the fuel processing assembly. The purge streams from the fuel cell stacks may be integrated into a suitable collection assembly through which the combined purge stream may be used for fuel, feedstock, heating, or otherwise harvested, utilized or stored.

Cathode region 34 receives an air stream 42, and releases a cathode air exhaust stream 44 that is partially or substantially depleted in oxygen. Air stream 42 may be delivered by an air delivery system 46, which is schematically illustrated in FIG. 3 and may take any suitable form, such as a fan, blower or the like. Electrons liberated from the hydrogen gas cannot pass through barrier 36, and instead must pass through an external circuit 49, thereby producing electric current 26 that may be used to meet the load applied by device 28. Current 26 may also be used to power the operation of the fuel cell system. The power requirements of the fuel cell system are collectively referred to as the balance of plant requirements of the fuel cell system.

Because fuel cell system 10 relies upon a single fuel cell stack and a single fuel processor, it suffers from some limitations due to its reliance on those components. For example, if stack 22 requires maintenance, is damaged or otherwise needs to be removed from service, system 10 is unable to provide power to device 28, other than previously stored power, if any. Similarly, if fuel processor 12 requires maintenance, is damaged or otherwise needs to be removed from service, system 10 is unable to provide feedstock, such as product hydrogen stream 14, to fuel cell stack 22, other than previously stored feedstock, if any.

SUMMARY OF THE INVENTION

The present invention is directed to a fuel cell system having a redundancy of at least one operational component, such as a redundancy of fuel cell stacks and/or a redundancy of fuel processors. In some embodiments, the fuel cell system may include a plurality of fuel cell stacks adapted to provide partial and/or total redundancy. In some embodiments, the fuel cell system includes a plurality of fuel cell stacks adapted to deliver the same maximum rated power output of a comparative fuel cell system having only a single fuel cell stack, thereby providing partial redundancy. In some embodiments, the fuel cell system includes a plurality of fuel cell stacks adapted to deliver more than the maximum rated power output of a comparative fuel cell system having only a single fuel cell stack. In some embodiments, the fuel cell system includes a plurality of fuel cell stacks having at least n+1 (or total) redundancy compared to a fuel cell system having only a single fuel cell stack. In some embodiments, the fuel cell system includes a control system. In some embodiments, the fuel cell system may include a plurality of fuel processors to provide partial or total redundancy.

DETAILED DESCRIPTION AND BEST MODE OF THE INVENTION

Figure 4:
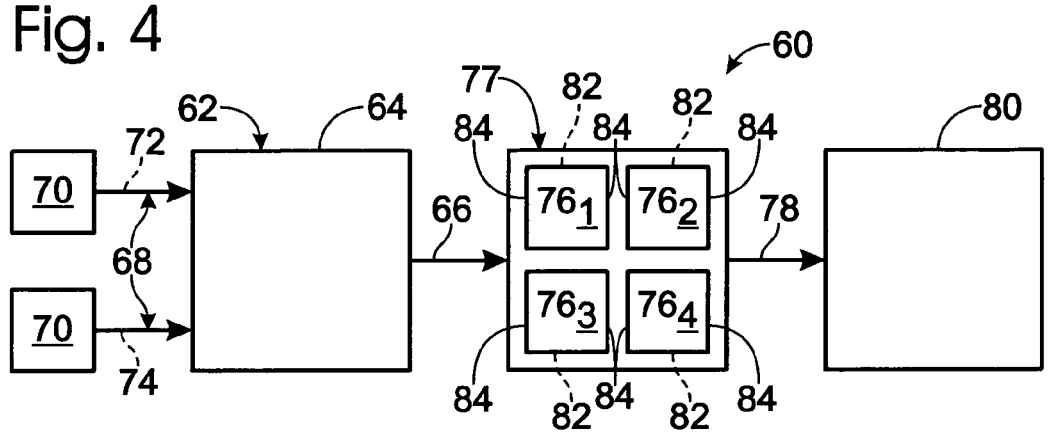
FIG. 4 is a schematic diagram of a fuel cell system according to the present invention.

A fuel cell system constructed according to the present invention is shown in FIG. 4 and generally indicated at 60. System 60 includes a fuel processing assembly 62, which includes a fuel processor 64 that is adapted to produce a product hydrogen stream 66 from a feedstock delivered via feed stream 68. It should also be understood that the components of system 60 have been schematically illustrated and that the fuel cell system may include additional components other than those specifically illustrated in the figures, such as feed pumps, air delivery systems, heat exchangers, heating assemblies and the like, such as disclosed in the incorporated references.

Fuel processor 64 may produce product hydrogen stream 66 via any suitable mechanism. Examples of suitable mechanisms include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. In FIG. 4, feed stream 68 is shown being delivered as two separate streams from respective feed stock delivery systems 70. It is within the scope of the invention that the feed stream may be a single stream or may be more than two streams. Similarly, the feed stock delivery system may take any suitable form, such as a pump connected to a supply of feedstock, a valve assembly associated with a pressurized stream of feedstock, etc.

Figure 5:
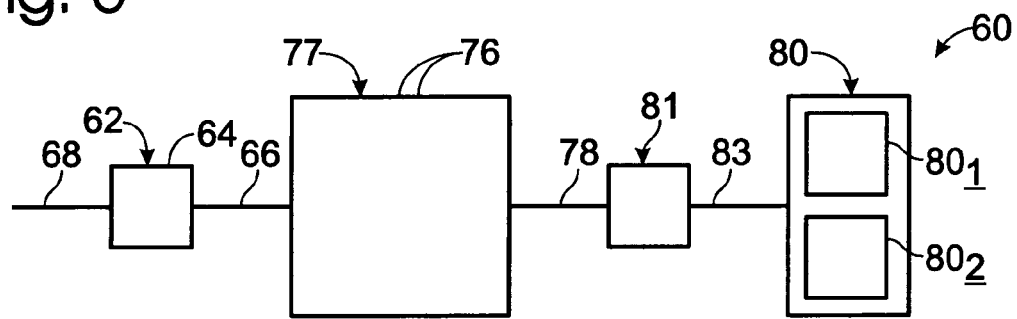
FIG. 5 is a schematic diagram of another fuel cell system according to the present invention.

For purposes of illustration, the following discussion will describe fuel processor 64 as a steam reformer adapted to receive a feed stream 68 containing a carbon-containing feedstock 72 and water 74. However, it is within the scope of the invention that the fuel processor 64 may take other forms, as discussed above. Examples of suitable carbon-containing feedstocks 72 include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol. When the carbon-containing feedstock is soluble in water, the carbon-containing feedstock and water may be, but are not necessarily, delivered in a single feed stream 68, such as shown in FIG. 5. When the carbon-containing feedstock is not soluble in water, separate feed streams 68 are used, such as shown in FIG. 4.

Examples of suitable steam reformers are disclosed in U.S. patent application Ser. No. 09/291,447, which is entitled "Fuel Processing System," was filed on Apr. 13, 1999, and the disclosure of which is hereby incorporated by reference. Examples of other components of fuel processing assembly 62 are also disclosed in U.S. patent application Ser. No. 09/190,917, which is entitled "Integrated Fuel Cell System," was filed on Nov. 12, 1998, and the disclosure of which is hereby incorporated by reference.

As shown in FIG. 4, fuel processing assembly 62 is adapted to deliver at least a portion of product hydrogen stream 66 to a plurality of fuel cell stacks 76. Collectively, the plurality of fuel cell stacks 76 may be referred to as a stack assembly 77. Stacks 76 produce an electric current 78 from the portion of product hydrogen stream 66 delivered thereto, and this current may be used to satisfy the energy demands, or applied load, of an energy-consuming device 80. Illustrative examples of devices 80 include, but should not be limited to, a motor vehicle, recreational vehicle, boat, tools, lights or lighting assemblies, appliances (such as household or other appliances), one or more residential dwellings, such as a household, apartment, townhouse, condominium, etc.), commercial buildings, microwave relay stations, signaling or communication equipment, etc. It should be understood that device 80 is schematically illustrated in FIG. 4 and is meant to represent one or more devices or collection of devices that are adapted to draw electric current from the fuel cell system. To further illustrate this point, device 80 is shown in FIG. 5 as including a pair of devices $80_1$ and $80_2$. Each device 80 has a plurality of operational states that includes at least a first operational state, in which the device is applying at least a portion of the applied load on fuel cell stack assembly 77, and a second operational state, in which the device is not applying a load on stack assembly 77.

Figure 3:
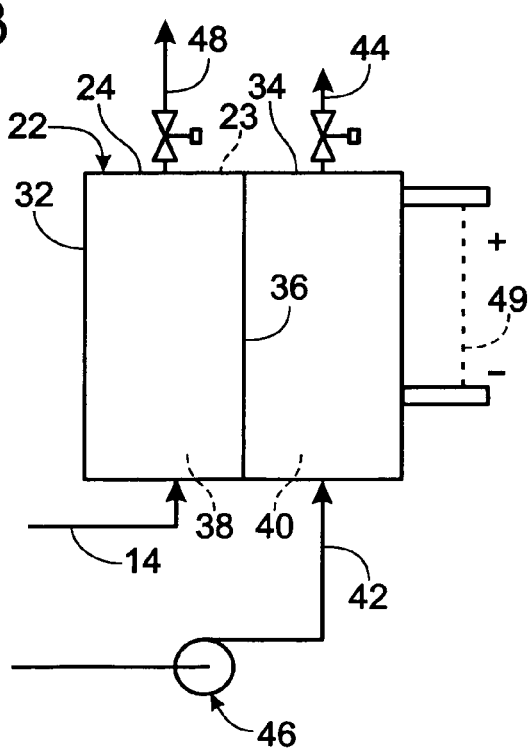
FIG. 3 is a schematic diagram of a conventional fuel cell stack.

In the illustrative example shown in FIG. 4, four stacks are shown and are generally indicated at $76_1$-$76_4$. It is important to distinguish that system 60 includes a plurality of fuel cell stacks 76, and not merely a single fuel cell stack containing a plurality of fuel cells. As shown, each fuel cell stack contains one or more fuel cells 82 (and typically contains a plurality of fuel cells) connected between common end plates 84 and having common fluid conduits. Examples of suitable fuel cells are proton-exchange-membrane (PEM) fuel cells and alkaline fuel cells, however, any other suitable fuel cell may be used. Similarly, the stacks and cells may be similar in construction to the stack shown in FIG. 3. The fuel cells 82 in each stack function as a unit to produce electric power from the feedstock delivered to the stack, such as from the portion of product hydrogen stream 66 that is delivered to the stack. Each stack has a plurality of operational states that include at least a first operational state, in which the stack is receiving at least a portion of product hydrogen stream 66 and producing an electric current therefrom, and a second operational state, in which the fuel cell stack is not producing an electric current (and typically not receiving a portion of stream 66).

Unlike a single fuel cell stack, each stack in assembly 77 may operate independent of the other stacks. By this it is meant that if one of the stacks fails or is otherwise removed from operation, such as for maintenance or repair, the other stacks may continue to operate and thereby produce current 78 to satisfy at least a portion of the applied load from device 80. Although the total rated power output of the stack assembly will not be available when at least one of the stacks is off-line or otherwise not producing an electric current, the stack assembly will still be able to produce a portion of its rated power output as long as at least one of its stacks is operating. In other words, stack assembly 77 provides an alternative to having either a single functioning stack, in which the maximum rated power output is available to supply the applied load of device 80, and no functioning stack, in which no power output is available, other than from previously stored power, if any.

To further expand upon the utility of stack assembly 77, it may be helpful to define some terms that are used herein and to provide some illustrative applications of stack assembly 77 and system 60. As used herein, "maximum rated power output" refers to the power output that a fuel cell stack 76 is designed, or configured, to produce. For example, manufacturers of fuel cell stacks, such as Energy Partners, Plug Power, Nuvera, H-Power, Ballard Power, International Fuel Cells, Teledyne and others, rate their stacks with a maximum power output within which the stacks are designed to safely operate. Similarly, the term "total rated power output" refers to the combined maximum rated power output of a plurality of fuel cell stacks in stack assembly 77. As used herein, "maximum desired power output" refers to the maximum power output a fuel cell stack or stack assembly needs to provide to satisfy the applied load from device 80. As used herein, the term "intermediate power output" and "intermediate rated power output" refer to the output of a fuel cell stack assembly that is less than its total rated power output. For example, if a stack assembly includes three stacks and one of the stacks is offline, the stack assembly will be able to provide an intermediate power output, namely the sum of the maximum rated power outputs of the remaining two stacks. This output may also be referred to as the available rated power output of the stack assembly, which will change depending upon the number of available stacks at a particular time.

A particular device 80 may apply a fixed or a variable load to fuel cell system 60 (and fuel cell stack assembly 77). The magnitude and variability of the applied load will tend to vary with the particular type and construction of device and application within which the device is used. For example, a particular device 80 may normally apply loads to stack assembly 77 within the range of 300 W and 15 kW. Stack assembly 77, in turn, may be designed to provide up to 20 kW of power so that the stack assembly may satisfy this load, supply the balance-of-plant requirements of system 60, and additionally or alternatively provide a buffer in case the applied load from device 80 on some occasion exceeds its normal range of values. In such a configuration, the total rated power output of the stack assembly is 20 kW, and the maximum desired power output of stack assembly 77 is 15 kW. The maximum rated power output of the individual stacks 76 in stack assembly 77 may vary, such as depending upon the number of stacks and the degree of desired redundancy, as discussed in more detail herein.

For purposes of illustration, the following ranges of operating power requirements of exemplary devices 80 are presented. Automobiles generally require 5-75 kW of power, with 5 kW representing cruising on a level surface and 75 kW representing hard acceleration. A backup power supply for a household generally requires power in the range of 300 W to 13-15 kW. A recreational vehicle, mobile home or the like typically has a power requirement in the range of 300 W to 7-10 kW, excluding motive power requirements. By this it is meant that this range of power represents the electrical power needed to run the heating, air conditioning and appliances of the recreational vehicle, but not the power to drive the vehicle. Seacraft, such as sailboats, tend to have power requirements in the range of 100-300 W to 2-5 kW. Some devices 80, such as uninterruptable power supplies (UPSs) may be designed for a particular power requirement that depends upon the specific environment in which the power supply is used. For example, a UPS that is configured to provide power to a personal computer may only require 300 W of power. However, a UPS designed to provide power to communications equipment, signaling equipment, a laboratory, a network of computers, or the like may have a much higher power requirement.

It should be understood that the above ranges are illustrative examples and that similar devices 80 may operate outside of the identified ranges. Similarly, it should be understood that the above ranges are referred to as operating power requirements because each of the devices may be disconnected or shut down, in which case the device will have no power requirement.

It is within the scope of the present invention that the number of fuel cell stacks 76 in stack assembly 77 may vary from two to several dozen or more stacks. Because system 60 includes a plurality of independent stacks 76, each stack may be smaller and may have a maximum rated power output that is less than would otherwise be required if only a single stack was used, such as stack 22 in system 10. When smaller stacks are used, they will typically be less expensive than a single larger stack. This decrease in individual stack cost is somewhat buffered by the increase in additional controls and fluid conduits required for the additional stack. As discussed in more detail herein, each of the stacks may alternatively be equal in rated power output to the corresponding stack 22 in system 10.

As a comparative example, consider a fuel cell system 10 designed to provide 3 kW of backup power (such as emergency or standby power applications) to a household. Continuing this example, the system may provide power to satisfy the balance-of-plant requirements of the fuel cell system (namely, the power required by the components of system 60). The balance-of-plant requirements and losses in power electronics typically range from a few hundred Watts to approximately 1 kW. In such a system, the maximum desired power output is 3 kW, and the maximum rated power output of stack 22 may be 4 kW. System 10 therefore, is able to provide the maximum desired power output of the household, as well as to provide the system's balance-of-plant requirements. However, if stack 22 needs to be removed from operation, such as if the stack fails, operates beyond acceptable operating parameters, needs to be upgraded, is contaminated, or needs to be otherwise serviced, inspected, or repaired, system 10 cannot provide power to the household until the stack is back in service. During this time, the household is without its source of backup power. As a reminder, this is an illustrative example and the values in a particular system may vary. For example, if the balance-of-plant requirements of a particular system exceed 1 kW, then a fuel cell stack 22 should be selected that has a higher maximum rated power output.

If fuel cell system 60 is used instead of system 10, the system is able to provide at least an intermediate power output, even if one of the stacks 76 in stack assembly 77 fails or is otherwise offline, shut down or otherwise removed from service. For example, if stacks $76_1$-$76_4$ each have a maximum rated power output of 1 kW, the stack assembly will have a total rated power output that equals the rated power output of system 10. Should one of the stacks be offline, stack assembly 77 (and system 60) will still be able to provide an intermediate power output of 3 kW. In such a situation, the maximum desired power output of the household or other device 80 may not be able to be met, but at least a portion, and in some cases a substantial portion of this maximum rated power output may be met. Accordingly, stack assembly 77 may be described as having a first operational state, in which all of stacks 76 are producing an electric current, a second operational state, in which none of stacks 76 are producing an electric current, and a third operational state, in which at least one of stacks 76 is producing an electric current and at least one of stacks 76 is not. Furthermore, it should be remembered that many devices 80 apply a load that corresponds to less than their maximum desired power output during a majority, if not a substantial portion (80% or more) of their operating time. In such a situation, the stack assembly will be able to meet the applied load of the household even though it is not able to provide the maximum desired power output.

From the above example, the utility is demonstrated of a stack assembly 77 comprised of individual stacks 76 that collectively have a total rated power output that equals the maximum desired power output of device 80. Such a system 60 may be described as having a fuel cell stack assembly, or a plurality of fuel cell stacks, that individually have rated power outputs that are less than the maximum desired power output from the fuel cell system, but collectively satisfy the maximum desired power output of the system. Such a system may also be described as having intermediate or partial redundancy, in that the system may provide an intermediate power output even if one or more of the individual stacks fails (so long as there is at least one operating stack).

As discussed above, the number of fuel cell stacks 76 in stack assembly 77 may vary, but will always include at least two fuel cell stacks. For example, the stack assembly described in the context of the above example may alternatively include eight stacks 76 with rated power outputs of 500 W, two stacks 76 with rated power outputs of 2 kW, three stacks 76 with rated power outputs of 1.33 kW, etc.

In some embodiments of the invention, it may be desirable for the power rating of each individual stack 76 to be sufficient to provide at least one "extra" stack that will enable the system to still achieve the maximum rated power output even if one or more stacks fails or is offline, such as for servicing, maintenance or repair. For example, assuming a 4 kW system is desired, having five stacks rated at 1 kW enables the maximum desired power output to still be achieved even if one of the stacks needs to be taken offline or fails. In this configuration, system 60 may be described as having n+1 redundancy, in that it may still provide the maximum desired power output even if one stack is not producing power. It is within the scope of the invention that any desired level of redundancy may be provided, such as n+2 redundancy, n+3 redundancy, etc. When the fuel cell stack assembly includes at least n+1 redundancy, it may be referred to as having total redundancy, in that the stack assembly (and corresponding fuel cell system) may still provide the maximum desired power output even if one (or more, depending on the level of redundancy) individual stacks fail or are otherwise offline.

It should be understood that the increased system reliability provided by having additional stacks should be weighed against the expense of these additional stacks, such as the upfront costs, operating expenses, system demands, etc. Therefore, there is not a best configuration for all users and all purposes. Instead, a particular system may be selected depending upon such factors as the acceptable cost for the system, the desired level of intermediate redundancy and the desired level of total redundancy. For many applications, n+1 redundancy will be desirable. Of course, if a single fuel cell stack has a sufficiently high reliability, no redundancy may be required. However, it is often difficult to predict the actual reliability of a particular stack, especially when the stack may fail due to a failure of a system component up- or downstream of the stack. In many applications, some degree of redundancy may be required as a safeguard against the consequences of having a fuel cell system that cannot produce any current.

Figure 1:
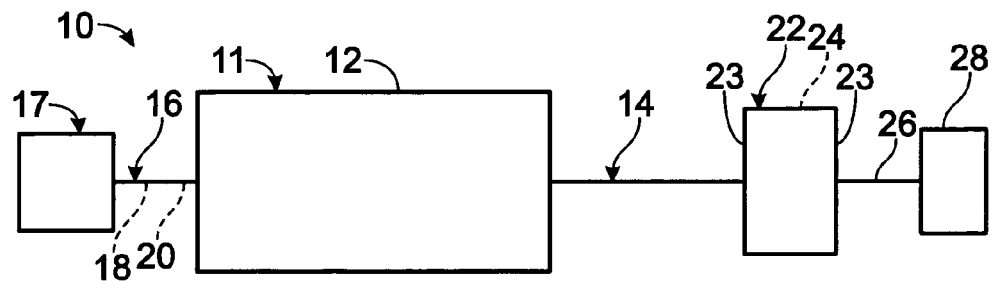
FIG. 1 is a schematic diagram of a conventional fuel cell system.
Figure 2:
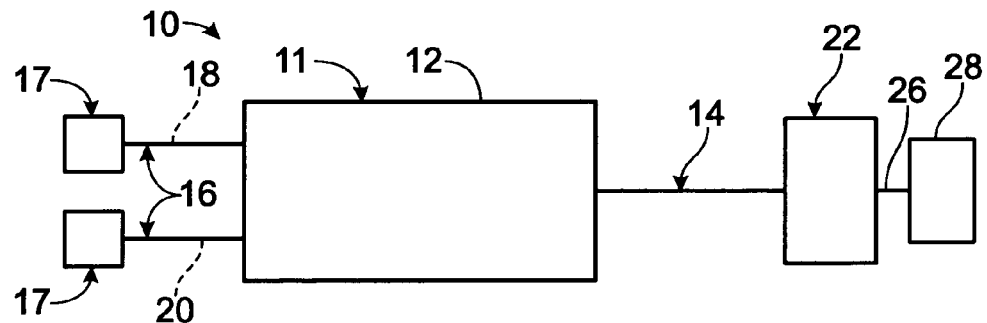
FIG. 2 is a schematic diagram of a conventional fuel cell system.

Because system 60 includes a plurality of fuel cell stacks 76 instead of the single stack 22 shown in FIGS. 1 and 2, the stacks may be brought online incrementally as needed to meet the applied load by device 80 (and/or the balance-of-plant requirements of the fuel cell system, which may be greater during startup of the system). Thus, for loads less than maximum, only that number of fuel cells necessary to meet the load demand are brought online and made operational. For demanding applications such as residential applications where extremely long lifetimes are required of the stacks, and where loads are cycling daily between maximum rated power output and minimum power output, only operating those fuel cell stacks needed to meet the load demand will result in reduced operating hours on the fuel cell stacks and longer lifetime. Thus, instead of having a single stack that is always online when the system is in use, system 60 may conserve the operative life of the individual fuel cell stacks by only utilizing the number of stacks necessary to meet the load applied by device 80. The operational state of the individual stacks may be manually selected, may be automatically controlled responsive to the magnitude of the applied load (from device 80 and system 60), or may be controlled by a control system, as discussed in more detail herein.

The fuel cell stacks may be electrically connected in series, parallel or a combination of series and parallel to meet the output voltage requirements of system 60. For example, the four 1 kW stacks discussed in the above illustration each may yield 12 VDC under load. These stacks may be electrically connected in series to yield an output of 48 VDC to the power electronics. It should be understood that these values are merely meant to provide illustrative examples, and that the voltage of the current produced by stack assembly 77 varies with the applied load. Preferably the fuel cell stacks are electrically isolated from each other to facilitate maintenance, service, replacement, etc. of one of more fuel cell stacks while the remaining stacks continue to supply electric power to device 80.

Figure 6:
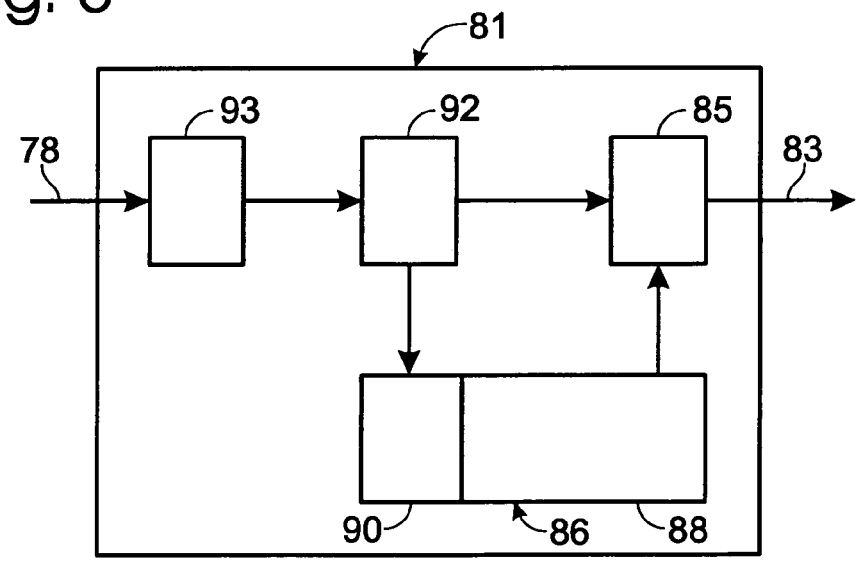
FIG. 6 is a schematic diagram of an embodiment of the power management module of FIG. 5.
Figure 7:
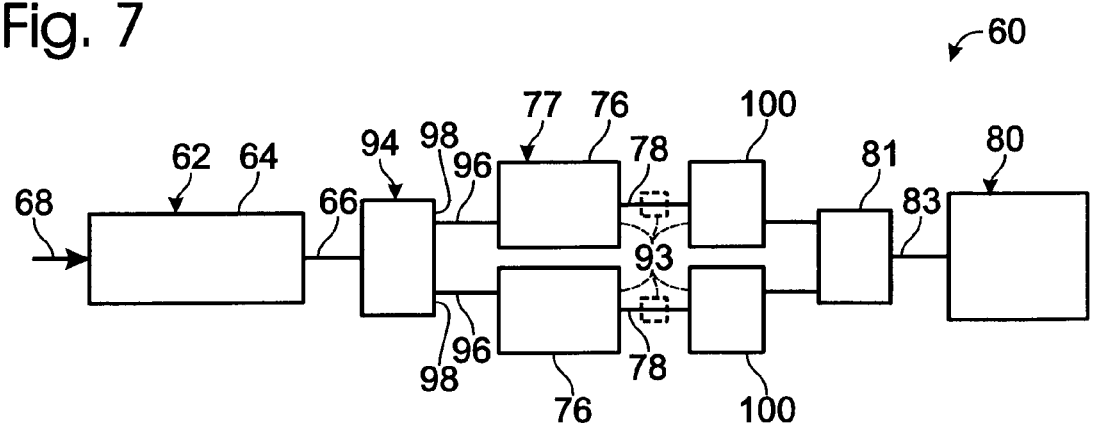
FIG. 7 is a schematic diagram of another fuel cell system according to the present invention.

In FIG. 5, an embodiment of system 60 is shown that includes a power management module 81 through which electric power from the plurality of fuel cell stacks is delivered to device 80. As shown, power (or current) 78 from stack assembly 77 passes through module 81 and then is subsequently delivered to device 80 as indicated at 83. When device 80 requires AC power, module 81 will include an inverter for converting the DC power from the fuel cell stacks to AC power. An example of a power management module including an inverter 85 is schematically illustrated in FIG. 6. Module 81 may additionally or alternatively include a battery assembly 86 containing one or more batteries 88 and associated chargers 90, which are adapted to store excess power, as well a switching assembly 92 that is adapted to selectively deliver power from stack assembly 77 to either device 80 or to the battery assembly. Module 81 may additionally, or alternatively, include at least one DC-DC converter 93, such as at least one boost DC-DC converter that increases the voltage of current 78 or at least one buck DC-DC converter that decreases the voltage of current 78. Converter 93 receives the unregulated DC stream from stack assembly 77, the voltage of which is variable with the applied load, and regulates the voltage of the stream to a selected value. The selected value may be more or less than the unregulated voltage and it may also vary depending upon whether the output stream of the converter is going to battery assembly 86 or device 80. Module 81 may contain a DC-DC converter for each stack 76, or alternatively, each fuel cell stack may be electrically connected to, or include, a dedicated DC-DC converter 93, such as schematically illustrated in FIG. 7 with dashed lines. As shown, the DC-DC converters may be integrated with fuel cell stacks 76, with contactors 100, or they may be discrete units downstream from the fuel cell stacks. The regulated DC output from the dedicated DC-DC converters may be connected in parallel or series. It should be understood that module 81 may include components other than those discussed herein, and that not all of the above components are required in every embodiment of a power management module.

In FIG. 7, a further embodiment of system 60 is shown and includes a delivery manifold assembly 94 that receives at least a portion of product hydrogen stream and distributes the stream to the fuel cell stacks forming stack assembly 77. As shown, assembly 94 receives product hydrogen stream 66 and distributes hydrogen streams 96 to stacks 76. Preferably, the manifold assembly is adapted to only deliver hydrogen gas to the operating stacks in stack assembly 77. To further illustrate that the number of fuel cell stacks in stack assembly 77 may vary, stack assembly 77 is shown in FIG. 7 with only a pair of fuel cell stacks 76. As discussed, there must be at least two stacks to provide some level of intermediate and/or total redundancy.

Fuel cell system 60 may include a valve assembly 98 adapted to regulate, or selectively interrupt, the flow of hydrogen gas from manifold 94 to selected ones of the fuel cell stacks in stack assembly 77. The valve assembly may additionally be adapted to regulate or selectively interrupt the flow of hydrogen gas to the entire stack assembly. Valve assembly 98 may include any suitable structure for selectively enabling or interrupting the flow of hydrogen gas to stack assembly 77 and/or stacks 76. Examples of suitable devices include flow regulators, valves, switches, switch assemblies, solenoids, and the like. In FIG. 7, valve assembly 98 is shown integrated within manifold 94. It is within the scope of the present invention, however, that valve assembly 98 may be located external the delivery manifold assembly, although in some embodiments it may still be in direct or indirect cooperative communication therewith.

Fuel cell system 60 may also include contactors or other suitable devices 100 that may be actuated to electrically isolate one or more of the fuel cell stacks 76 in assembly 77 from the applied load. The contactors may be actuated either manually, such as to remove a stack for servicing, automatically, such as upon exceeding certain operating parameters or load conditions, and/or by a control system. For example, a contactor may be actuated to remove a particular stack from service if the stack is operating at too high of temperature, if the potential in the stack is too low, if the stack has been contaminated, such as by exposure to carbon monoxide, if the stack needs to be serviced or inspected, or if the stack is not needed to meet the applied load.

Figure 8:
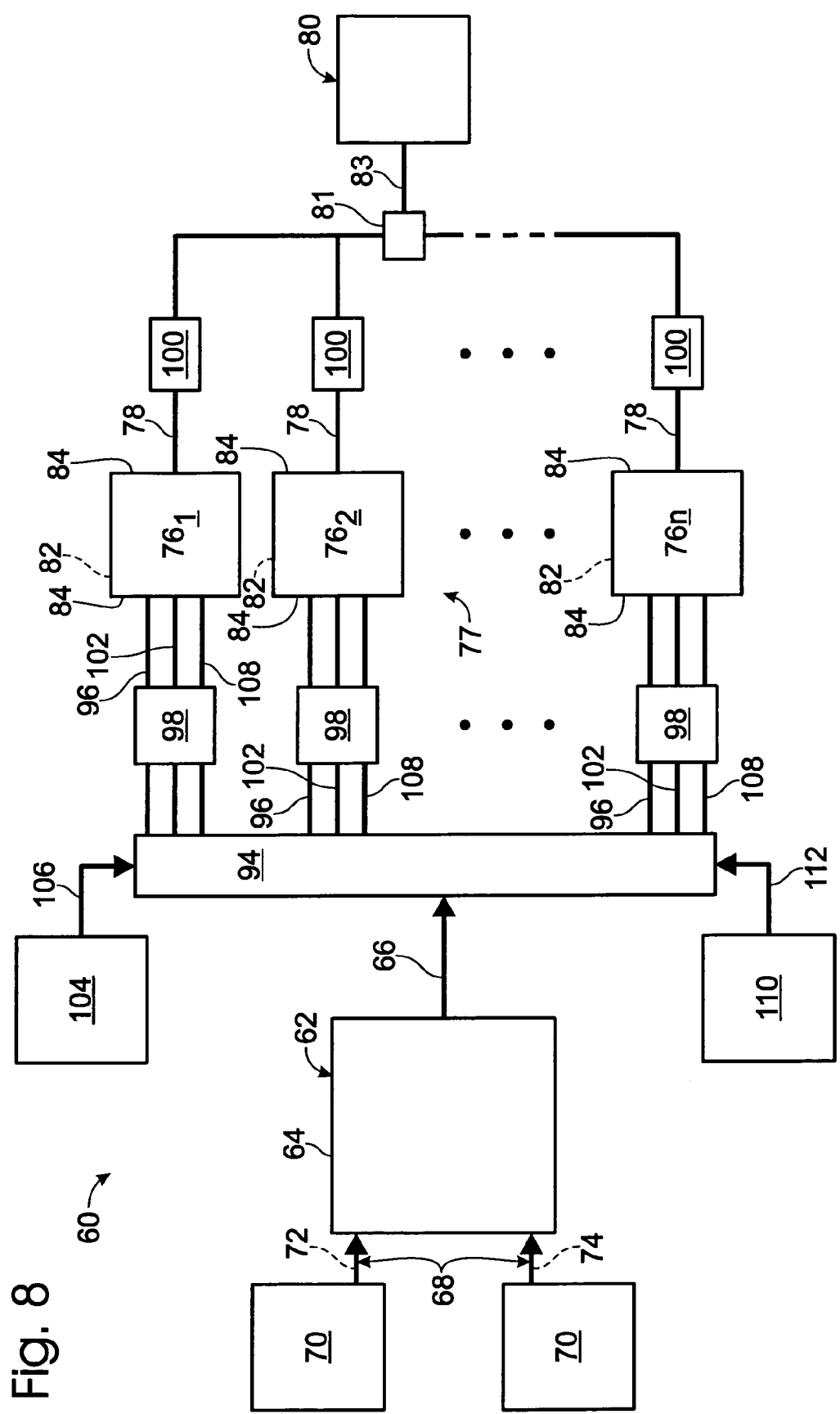
FIG. 8 is a schematic diagram of another fuel cell system according to the present invention.

Stack assembly 77 may receive feeds other than hydrogen gas. For example, fuel cell stacks 76 may each receive an air stream 102 from an air delivery system 104. As discussed above with respect to FIG. 3, the air streams are delivered to the cathode regions of the stacks. The air streams may be distributed to the stacks by delivery manifold assembly 94, such as shown in FIG. 8. In the illustrated embodiment, air delivery system 104, which may take any suitable form, delivers an air stream 106 to manifold assembly 94, which in turn distributes air streams 102 to stacks 76. The embodiment of fuel cell system 60 shown in FIG. 8 also illustrates switch assemblies 98 located external manifold assembly 94. Furthermore, stack assembly 77 is shown including individual fuel cell stacks $76_1$, $76_2$ through $76_n$, to illustrate that any selected number of stacks may be used.

Stacks 76 may also receive a cooling fluid stream 108 that regulates the operating temperature of the stacks. An example of a cooling fluid supply, or delivery system is schematically illustrated at 110 in FIG. 8 and may take any suitable form. System 110 delivers a stream 112 of cooling fluid to the manifold assembly, which in turn delivers streams 108 to the individual stacks. Examples of suitable cooling fluids, include, but are not limited to, air, water, glycols, and water-glycol mixtures. The cooling fluid streams may form a cooling fluid loop, or the streams may be vented, exhausted, or otherwise used or disposed of after being used to cool stacks 76. It should be understood that the cooling fluid is not introduced directly into the anode or cathode regions of the stacks. Instead, it may flow through a jacket that surrounds a fuel cell stack, between fuel cells 82 forming the stack, and/or through conduits extending through the anode and/or cathode regions.

Similar to hydrogen streams 96, it is preferable that air streams 102 are only delivered to the stacks in stack assembly 77 that are operating to produce current stream 78. For example, delivering an air stream to a PEM fuel cell that is not being used to produce an electric current may dry out the electrolytic membrane used in the stack's cells. Cooling fluid streams 108 may be delivered to only the operating stacks or may be delivered to all of the stacks in stack assembly 77 at all times. For example, it may be less demanding or require less resources to maintain a continuous flow of cooling fluid to all of the stacks than to regulate and selectively interrupt the flow of cooling fluid.

Figure 9:
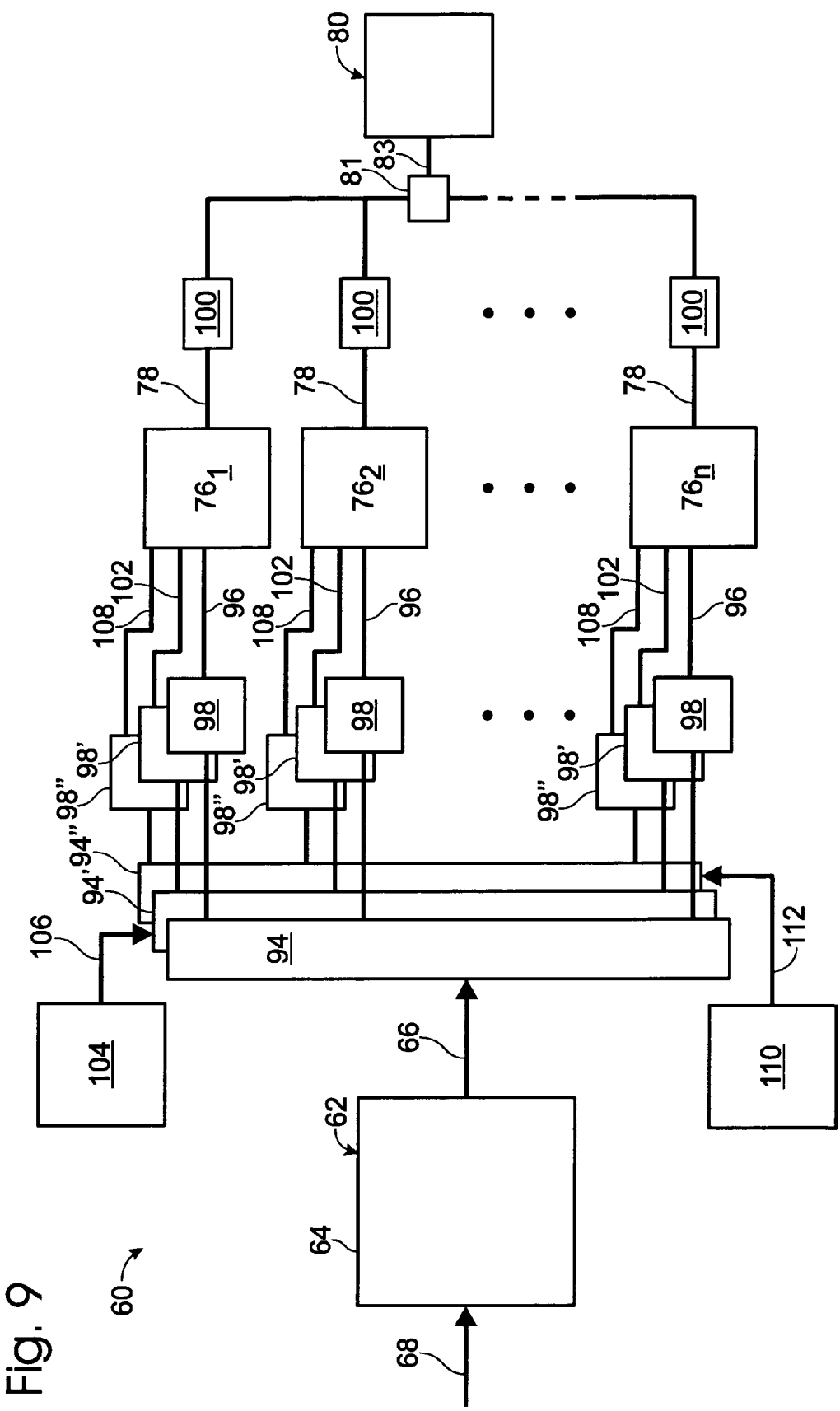
FIG. 9 is a schematic diagram of another fuel cell system according to the present invention.

While a single delivery manifold assembly 94 is shown in FIG. 7, fuel cell system 60 may include separate assemblies for each of the feeds to stack assembly 77. An exemplary embodiment of such a fuel cell system 60 is shown in FIG. 9, in which hydrogen gas is distributed by manifold assembly 94, air is distributed by manifold assembly 94' and cooling fluid is distributed by manifold assembly 94". It is further within the scope of the invention that the individual stacks may receive any or all of these streams directly from the above-described supplies or sources without requiring a manifold assembly, and that each of the stacks may receive one or more of these streams from an independent supply or delivery system.

When streams 96, 102 and/or 108 are delivered to the individual stacks 76 in stack assembly 77 via a delivery manifold assembly, it is preferable that the streams are delivered in parallel, rather than in series. This configuration enables all of the stacks to receive the respective streams at essentially the same composition, temperature, etc.

Figure 10:
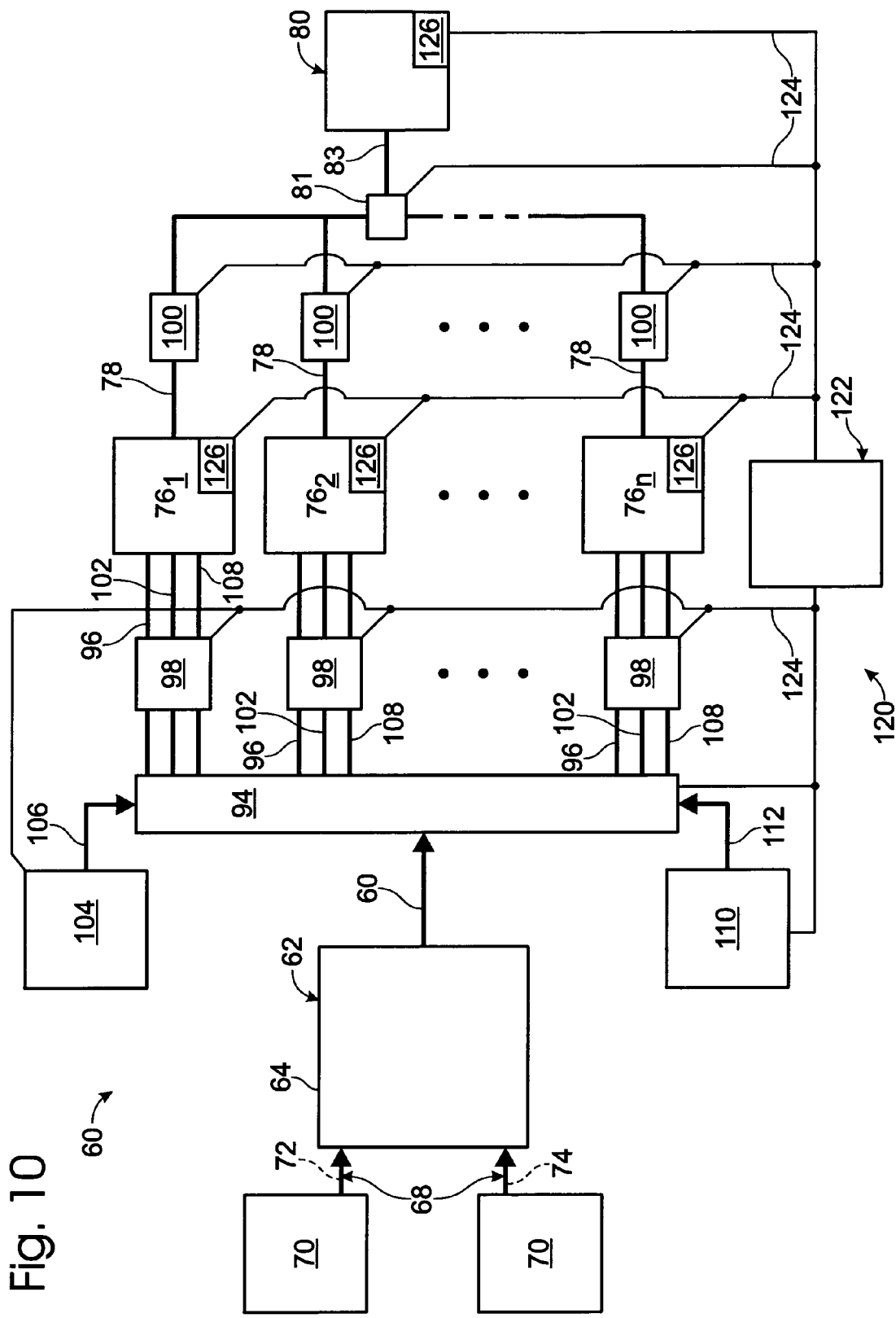
FIG. 10 is a schematic diagram of a fuel cell system with a control system according to the present invention.
Figure 11:
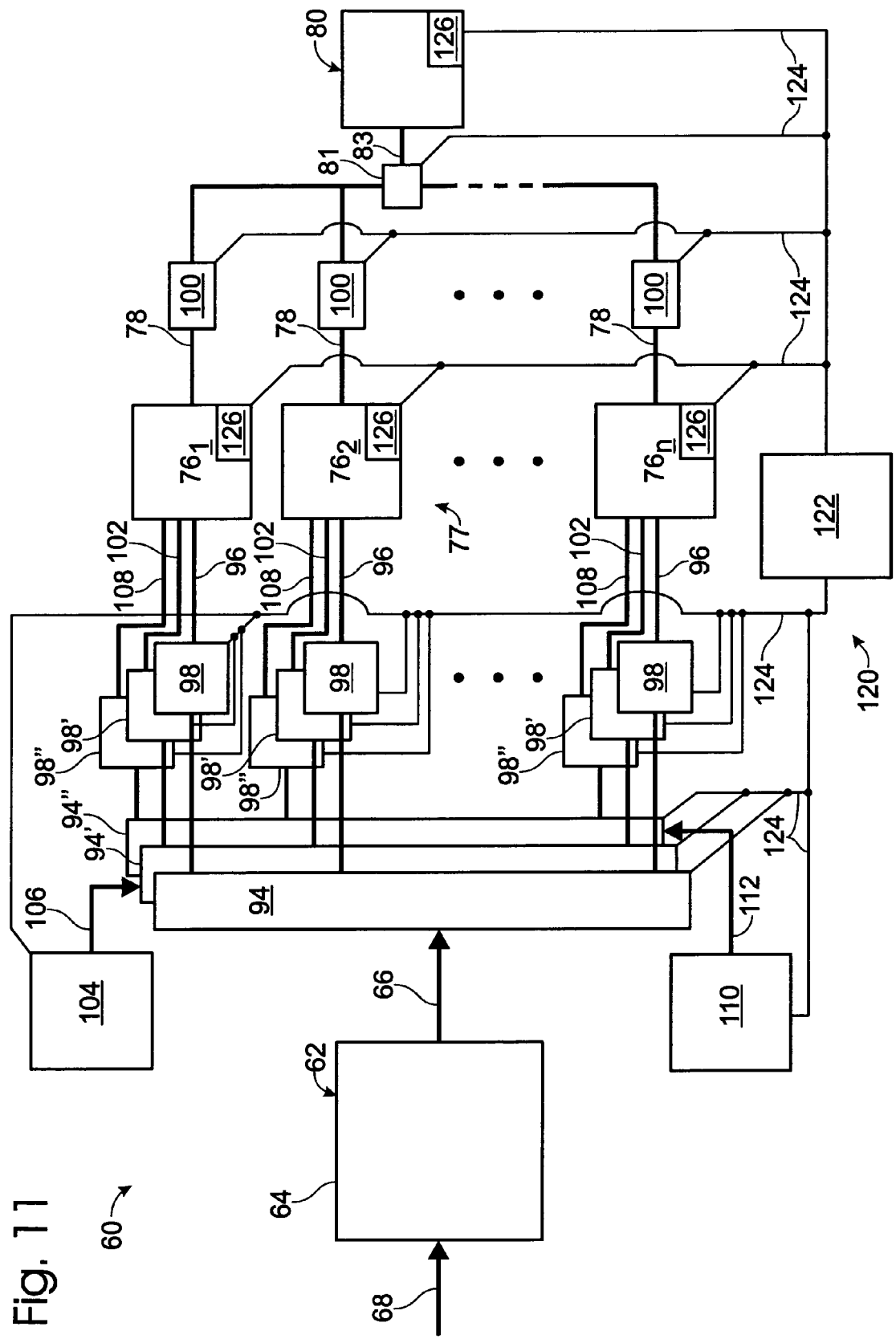
FIG. 11 is a schematic diagram of another fuel cell system with a control system according to the present invention.

In FIG. 10, an embodiment of fuel cell system 60 is shown in which the system includes a control system 120 with a controller 122 that is adapted to manage the operation of system 60. As shown, controller 122 communicates with various components of the fuel cell system via communication links 124. Links 124 may be any suitable form of mechanical, wired or wireless communication between the controller and the corresponding portions of the fuel cell system. The communication links may enable one- or two-way communication. Two-way communication links enable the controller to receive inputs from and send control signals to various components of the fuel cell system. Examples of suitable inputs include one or more current operating conditions, such as temperature, pressure, flow rate, composition, state of actuation, load, etc. These inputs may be received from the corresponding component directly, or from sensor assemblies 126 associated with the selected components.

Illustrative communication links 124 and sensors 126 are shown in FIG. 10, however, it should be understood that it is within the scope of the present invention that control system 120 may not include all of the links and sensors shown in FIG. 10 in all embodiments. Similarly, the control system may also include additional sensors and links, such as in communication with fuel processing assembly 62 (and its fuel processor(s) 64) and/or device 80.

Control system 120 may be used to selectively isolate a stack from the applied load by sending a control signal to the corresponding contactor 100. For example, a stack may be isolated from the applied load if the stack is determined, such as from communication from sensor assembly 126, other sensors or detectors, manual observation, or the like, to be operating outside of acceptable operating parameters.

In embodiments of the fuel cell system in which each fuel cell stack 76 includes its own DC-DC converter, each DC-DC converter may be adapted to automatically isolate the corresponding stack if the stack is delivering substandard performance in response to the applied load. For example, if a particular DC-DC converter does not receive current 78 having a voltage that exceeds a selected minimum voltage, then the DC-DC converter automatically isolates the stack from the applied load, such as by actuating contactor 100 or a suitable contactor or other switch associated with the DC-DC converter.

Control system 120 may additionally or alternatively be used to selectively adjust or interrupt the flow of hydrogen gas, air and/or cooling fluid to one or more of the stacks forming assembly 77. For example, the flow of hydrogen and air, and optionally cooling fluid to a particular stack may be interrupted so that the stack does not produce electric current. Typically, the corresponding contactor 100 will also be actuated to isolate the stack from feeds and from the applied load. Control system 120 may also isolate one or more of the stacks if a contaminant in the hydrogen gas stream is detected, such as to prevent the contaminated hydrogen gas from being delivered to the stack.

Again, returning to the illustrative example of a residential fuel cell system rated at 4 kW gross electric or 3 kW net electric, when the load demand falls to a value substantially less than 3 kW the fuel cell controller may send a signal to turn off and isolate one or more of stacks 76. Especially during those periods when power consumption is at a minimum in a normal residential home, such as late night and mid-day, up to three of the four fuel cell stacks may be signaled to turn off and be electrically isolated to reduce the net power output to less than 1 kW, sufficient only to meet the minimum load demands of the residence during periods of minimal power requirements. In this example, if the periods of minimum power consumption in the house last 12 hours each day, and if only one 1-kW stack is required to be online to meet the minimum loads, then taking 3 of the 4 fuel cell stacks offline will effectively increase the lifetime of the stacks by 60%. (In a four-day period each fuel cell stack will operate for one full day and three half days, or 60 hours of operation for every 96-hour period.)

It should be understood that the increase in lifetime is proportional to the percentage of total system operating time that a particular stack is offline. Controller 122 may be adapted to select the stack to be removed from service according to a predetermined sequence, or alternatively, the stack may be randomly selected or it may be rotated. A predetermined sequence maximizes the operating hours of a particular stack, while minimizing the life of the others. In this situation, the maximized stack is going to fail much sooner than the rest, but only that particular cell will need replacement. If in a rotational sequence, in which the particular stack that remains online is rotated sequentially between the stacks, such as on an hourly, daily, weekly, or monthly basis, the overall operating time of the stacks will be approximately the same, meaning that all of the stacks will tend to need replacement at approximately the same time, however, this time will be considerably longer than the time required to replace the single maximized stack in the predetermined sequence configuration.

Figure 12:
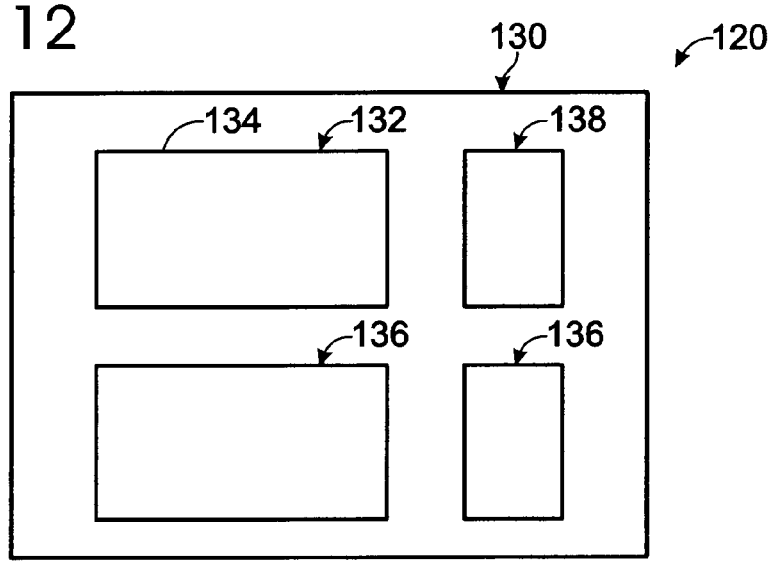
FIG. 12 is a schematic diagram of a user interface suitable for use with fuel cell systems according to the present invention.

Control system 120 may include a user interface 130 in communication with the controller. User interface 130 enables a user to monitor and/or interact with the operation of the controller. An illustrative example of a user interface 130 is shown in FIG. 12. As shown, interface 130 includes a display region 132 with a screen 134 or other suitable display mechanism in which information is presented to the user. For example, display region 132 may display the current values measured by one or more of sensor assemblies 126, the threshold and actual operating parameters of system 60 or device 80, the applied load to the stack assembly and individual stacks therein, the potential and other operating parameters of the stacks, etc. Previously measured values may also be displayed. Other information regarding the operation and performance of the fuel processing system may also be displayed in region 132.

User interface 130 may also include a user input device 136 through which a user communicates with the controller. For example, input device 136 may enable a user to input commands to change the operating state of the fuel cell system, to change one or more of the stored threshold values and/or operating parameters of the system, and/or to request information from the controller about the previous or current operating parameters of the system. Input device 136 may include any suitable device for receiving user inputs, including rotary dials and switches, pushbuttons, keypads, keyboards, a mouse, touch screens, etc. Also shown in FIG. 8 is a user-signaling device 138 that alerts a user when an acceptable threshold level has been exceeded and the fuel cell stack has been isolated. Device 138 may include an alarm, lights, or any other suitable mechanism or mechanisms for alerting users.

It should be understood that it is within the scope of the present invention that the fuel cell system may include a controller without a user interface, and that it is not required for the user interface to include all of the elements described herein. The elements described above have been schematically illustrated in FIG. 12 collectively, however, it is within the scope of the present invention that they may be implemented separately. For example, the user interface may include multiple display regions, each adapted to display one or more of the types of user information described above. Similarly, a single user input device may be used, and the input device may include a display that prompts the user to enter requested values or enables the user to toggle between input screens.

Control system 120 may be adapted to limit the magnitude of the peak load, or maximum desired power output, applied to fuel cell stack assembly 77, and/or any of the individual stacks 76 forming assembly 77. This load limitation may be in addition to or in the alternative to the features of the control system described above. Limiting the peak loads applied to the fuel cell system protects the system from damage should a peak load be applied that exceeds the rated power outputs of the stacks or stack assembly, or that exceeds the available rated power output of the stack assembly at a particular time. The load limitation may additionally enable the use of a fuel cell stack assembly 77 having a total rated power output that is less than the maximum desired power output otherwise required to satisfy the load applied to the stack assembly. In other words, it may enable the use of fuel cell stacks 76 with lower rated power outputs, which in turn are less expensive than comparative stacks having higher rated power outputs.

In applications where system 60 includes a power management module 81 with an inverter 85, these load managing controls by system 120 also allow the electronics to be designed for lower magnitude peak power, with resultant cost savings. Such load managing controls may be particularly effective when device 80 operates at an intermediate power output during a majority or a significant portion of the time, with the maximum desired power output only being required a small percentage of the time. An example of such a device 80 is a household, which may apply loads in the range of a few hundred Watts to 13-15 kW to system 60. However, other than during peak periods, such as one- or two-hour periods in the mornings and evenings, the household typically applies a load that is much less than its maximum desired power output.

Continuing with the illustrative example of a residential fuel cell system, load managing controls can effectively be used with a fuel cell system to reduce (manage) the magnitude of peaking loads in the household. This may be accomplished using switching modules 140 that major household appliances (dryer, dishwasher, hairdryer, microwave oven, coffee maker, etc.) are plugged into. The switching modules (collectively referred to as a switching module assembly) communicate with each other, controller 122, or both, and are capable of recognizing loads (appliances) of higher priority and signaling lower priority appliances to switch off. For example, a high priority appliance such as a microwave oven may signal a low priority appliance (such as a dishwasher or clothes dryer) to turn off so that the microwave oven may be used without significantly increasing the total household load demand. The signal originates through the switching module, which may be built into or otherwise integrated with the appliance, or it may be a separate module that the appliance is plugged into. Switching modules 140 may communicate with other switching modules by radio or by electrical signals sent through the existing household wiring. Frequency scrambled communication through existing wires is particularly effective, although any suitable communication link may be used. Additionally, or alternatively, the switching modules may communicate with controller 122, which in turn directs the selective on/off configuration (or operational state) of the appliances. The priority, or hierarchy of the devices or associated modules may be established by any suitable mechanism, such as by being predetermined by the individual switching modules (such as by having high priority modules, low priority modules, medium priority modules, etc.), or stored by the control system or switching module assembly.

Figure 13:
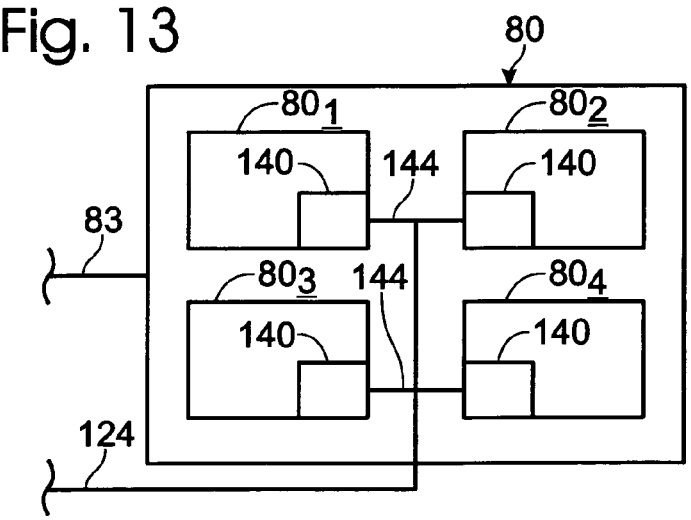
FIG. 13 is a fragmentary schematic diagram of an energy-consuming device according to the present invention.

An illustrative example of a device 80 having load limiting controls, which are collectively indicated at 142 is shown in FIG. 13. As shown, device 80 includes devices $80_1$-$80_4$, each of which includes or communicates with a switching module 140. The modules are shown being in communication with each other via communication links 144, and additionally or alternatively, in communication with controller 122 with communication link 124.

Managing the peak electrical loads of a household can result in the peak load demand being decreased. For example, in the continuing example used herein a household may have a maximum desired power output of 10-15 kW. This maximum desired power output may be reduced by 25%, 50% or more through the use of load limiting controls. For example, the maximum desired power output may be reduced to a range of 4-8 kW. As a result, the fuel cell system can effectively use fuel cell stacks with lower net electrical power output and the power electronics can be substantially downsized. The cost savings may be significant.

It should be understood that the invented fuel cell system, including the control system and load limiting controls, may be applied to energy-consuming devices 80 other than the residential household described above. Examples of other suitable devices include commercial buildings, vehicles, microwave relay stations, lights, appliances, tools, communication equipment, signaling devices and other devices 80 described herein.

As discussed previously, fuel processor 64 is any suitable device that produces hydrogen gas. Preferably, the fuel processor is adapted to produce substantially pure hydrogen gas, and even more preferably, the fuel processor is adapted to produce pure hydrogen gas. For the purposes of the present invention, substantially pure hydrogen gas is greater than 90% pure, preferably greater than 95% pure, more preferably greater than 99% pure, and even more preferably greater than 99.5% pure. Suitable fuel processors are disclosed in U.S. Pat. Nos. 5,997,594 and 5,861,137, pending U.S. patent application Ser. No. 09/291,447, which was filed on Apr. 13, 1999, and is entitled "Fuel Processing System," and U.S. Provisional Patent Application Ser. No. 60/188,993, which was filed on Mar. 13, 2000 and is entitled "Fuel Processor," each of which is incorporated by reference in its entirety for all purposes.

Figure 14:
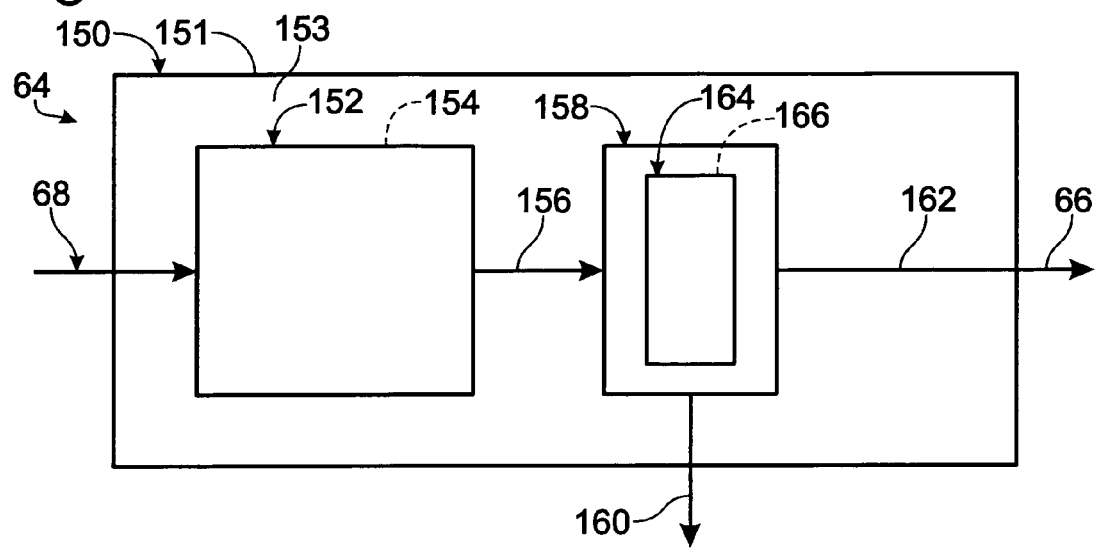
FIG. 14 is a schematic diagram of a suitable fuel processor for use in fuel cell systems according to the present invention.

An example of a suitable fuel processor 64 is a steam reformer. An example of a suitable steam reformer is shown in FIG. 14 and indicated generally at 150. Reformer 150 includes a reforming, or hydrogen-producing, region 152 that includes a steam reforming catalyst 154. Alternatively, reformer 150 may be an autothermal reformer that includes an autothermal reforming catalyst. In reforming region 152, a reformate stream 156 is produced from the water and carbon-containing feedstock forming feed stream 68. The reformate stream typically contains hydrogen gas and impurities, and therefore is delivered to a separation region, or purification region, 158, where the hydrogen gas is purified. In separation region 158, the hydrogen-containing stream is separated into one or more byproduct streams, which are collectively illustrated at 160, and a hydrogen-rich stream 162 by any suitable pressure-driven separation process. In FIG. 14, hydrogen-rich stream 162 is shown forming product hydrogen stream 66.

An example of a suitable structure for use in separation region 158 is a membrane module 164, which contains one or more hydrogen permeable metal membranes 166. Examples of suitable membrane modules formed from a plurality of hydrogen-selective metal membranes are disclosed in U.S. patent application Ser. No. 09/291,447, which was filed on Apr. 13, 1999, is entitled "Fuel Processing System," and the complete disclosure of which is hereby incorporated by reference in its entirety for all purposes. In that application, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other suitable membranes and membrane modules are disclosed in U.S. patent application Ser. No. 09/618,866, which was filed on Jul. 19, 2000 and is entitled "Hydrogen-Permeable Metal Membrane and Method for Producing the Same," the complete disclosure of which is hereby incorporated by reference in its entirety for all purposes. Other suitable fuel processors are also disclosed in the incorporated patent applications.

The thin, planar, hydrogen-permeable membranes are preferably composed of palladium alloys, most especially palladium with 35 wt % to 45 wt % copper. These membranes, which also may be referred to as hydrogen-selective membranes, are typically formed from a thin foil that is approximately 0.001 inches thick. It is within the scope of the present invention, however, that the membranes may be formed from hydrogen-selective metals and metal alloys other than those discussed above, hydrogen-permeable and selective ceramics, or carbon compositions. The membranes may have thicknesses that are larger or smaller than discussed above. For example, the membrane may be made thinner, such as by rolling, sputtering or etching with a commensurate increase in hydrogen flux. The hydrogen-permeable membranes may be arranged in any suitable configuration, such as arranged in pairs around a common permeate channel as is disclosed in the incorporated patent applications. The hydrogen permeable membrane or membranes may take other configurations as well, such as tubular configurations, which are disclosed in the incorporated patents.

Another example of a suitable pressure-separation process for use in separation region 158 is pressure swing adsorption (PSA). In a pressure swing adsorption (PSA) process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 156. The success of to using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent. Impurity gases such as $NH_3$, $H_2S$, and $H_2O$ adsorb very strongly on the adsorbent material and are therefore removed from stream 156 along with other impurities. If the adsorbent material is going to be regenerated and these impurities are present in stream 156, separation region 158 preferably includes a suitable device that is adapted to remove these impurities prior to delivery of stream 156 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms and configurations may be used.

Figure 15:
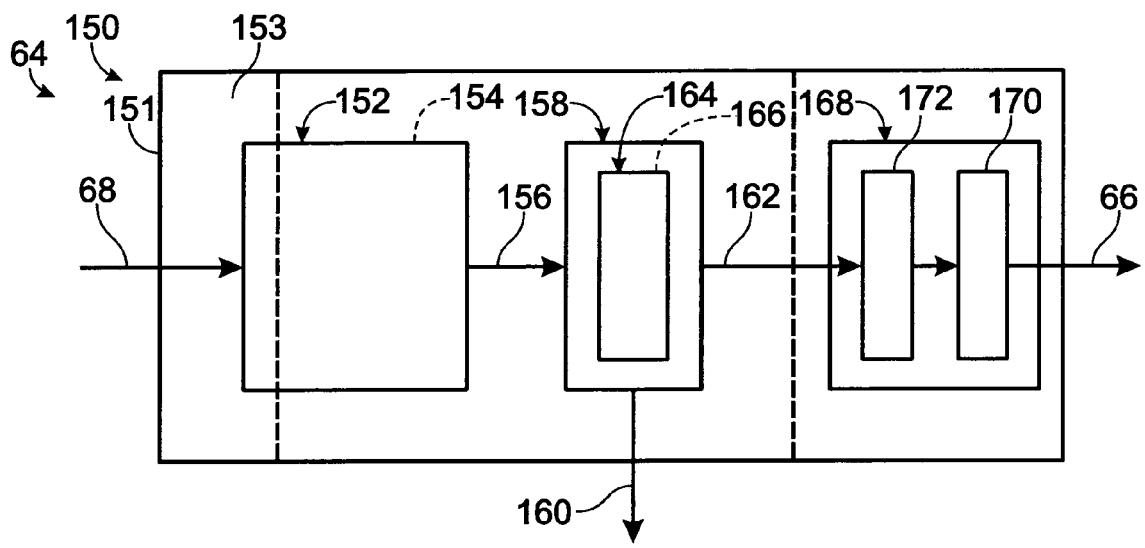
FIG. 15 is a schematic diagram of another suitable fuel processor for use in fuel cell systems according to the present invention.

Reformer 150 may, but does not necessarily, further include a polishing region 168, such as shown in FIG. 15. Polishing region 168 receives hydrogen-rich stream 162 from separation region 158 and further purifies the stream by reducing the concentration of, or removing, selected compositions therein. For example, when stream 162 is intended for use in a fuel cell stack assembly, such as assembly 77, compositions that may damage the fuel cell stack, such as carbon monoxide and carbon dioxide, may be removed from the hydrogen-rich stream. The concentration of carbon monoxide should be less than 10 ppm (parts per million) to prevent the control system from isolating the fuel cell stack. Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, even more preferably, less than 1%. Especially preferred concentrations are less than 50 ppm. It should be understood that the acceptable minimum concentrations presented herein are illustrative examples, and that concentrations other than those presented herein may be used and are within the scope of the present invention. For example, particular users or manufacturers may require minimum or maximum concentration levels or ranges that are different than those identified herein.

Region 168 includes any suitable structure for removing or reducing the concentration of the selected compositions in stream 162. For example, when the product stream is intended for use in a PEM fuel cell stack or other device that will be damaged if the stream contains more than determined concentrations of carbon monoxide or carbon dioxide, it may be desirable to include at least one methanation catalyst bed 170. Bed 170 converts carbon monoxide and carbon dioxide into methane and water, both of which will not damage a PEM fuel cell stack. Polishing region 168 may also include another hydrogen-producing device 172, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 700° C., and at pressures in the range of 50 psi and 1000 psi, although temperatures outside of this range are within the scope of the invention, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing system, or fuel cell system, by an external source, or both.

In FIGS. 14 and 15, reformer 150 is shown including a shell 151 in which the above-described components are contained. Shell 151, which also may be referred to as a housing, enables the fuel processor, such as reformer 150, to be moved as a unit. It also protects the components of the fuel processor from damage by providing a protective enclosure and reduces the heating demand of the fuel processor because the components of the fuel processor may be heated as a unit. Shell 151 may, but does not necessarily, include insulating material 153, such as a solid insulating material, blanket insulating material, or an air-filled cavity. It is within the scope of the invention, however, that the reformer may be formed without a housing or shell. When reformer 150 includes insulating material 153, the insulating material may be internal the shell, external the shell, or both. When the insulating material is external a shell containing the above-described reforming, separation and/or polishing regions, the fuel processor may further include an outer cover or jacket external the insulation.

It is further within the scope of the invention that one or more of the components may either extend beyond the shell or be located external at least shell 151. For example, and as schematically illustrated in FIG. 15, polishing region 168 may be external shell 151 and/or a portion of reforming region 152 may extend beyond the shell. Other examples of fuel processors demonstrating these configurations are illustrated in the incorporated references and discussed in more detail herein.

Figure 16:
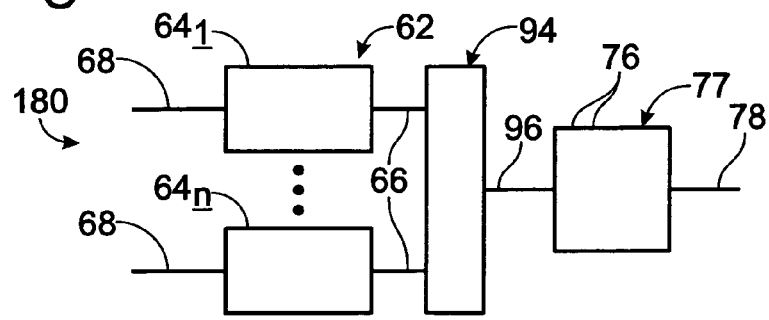
FIG. 16 is a schematic diagram of another fuel cell system according to the present invention.

As discussed previously, a fuel cell system according to the present invention may additionally or alternatively include partial or total redundancy regarding its fuel processors. An example of such a system is shown in FIG. 16 and generally indicated at 180. As shown, system 180 includes a fuel processing assembly 62 that includes a plurality of fuel processors 64. To illustrate that the fuel cell system includes at least two fuel processors, and may include more than two fuel processors, the fuel processors are indicated at $64_1$ to $64_n$. It should be understood that "n" may be as low as 2 and may be any selected number from two to a dozen or more. Similarly, although system 180 is shown also having a redundancy of fuel cell stacks 76, system 180 may be implemented with only a single stack 76.

INDUSTRIAL APPLICABILITY

The present invention is applicable to energy-producing systems, and more particularly to fuel processing and fuel cell systems.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A fuel cell system, comprising:
    a fuel processing assembly adapted to produce a product hydrogen stream from a feedstock;
    a fuel cell stack assembly adapted to receive at least a portion of the product hydrogen stream from the fuel processing assembly and to produce an electric current therefrom to at least partially satisfy an applied load having a magnitude, wherein the fuel cell stack assembly includes a plurality of fuel cell stacks that each have a maximum rated power output, wherein the fuel cell system is adapted to satisfy an applied load by supplying up to a maximum desired power output, wherein the fuel cell stack assembly has a total rated power output that is at least equal to the maximum desired power output, wherein each of the fuel cell stacks has a plurality of operational states that include at least a first operational state, in which the fuel cell stack receives at least a portion of the product hydrogen stream from the fuel processing assembly and produces an electric current therefrom, and a second operational state, in which the fuel cell stack is not producing an electric current, wherein each of the fuel cell stacks has a maximum rated power output, and further wherein each of the fuel cell stacks is adapted to selectively receive at least a portion of the product hydrogen stream and to produce an electric current therefrom; and
    a control system with a controller adapted to selectively regulate the operational states of the plurality of fuel cell stacks, wherein the controller is adapted to regulate the operational states of the plurality of fuel cell stacks responsive at least in part to the magnitude of the applied load, and further wherein the controller is adapted to selectively configure at least one of the plurality of fuel cell stacks from the first operational state to the second operational state responsive to an applied load that is less than the maximum desired power output.

2. The fuel cell system of claim 1, wherein each of the fuel cell stacks is adapted to receive at least a portion of the product hydrogen stream and to produce an electric current therefrom regardless of the operational state of the other fuel cell stacks.

3. The fuel cell system of claim 1, wherein each of the fuel cell stacks is adapted to receive at least a portion of the product hydrogen stream and to produce an electric current therefrom independent of the operational state of the other fuel cell stacks.

4. The fuel cell system of claim 1, wherein the fuel cell stack assembly has a total rated power output that is greater than the maximum desired power output.

5. The fuel cell system of claim 4, wherein the total rated power output of the fuel cell stack assembly is greater than the maximum desired power output by at least the maximum rated power output of one of the plurality of fuel cell stacks.

6. The fuel cell system of claim 4, wherein the total rated power output of the fuel cell stack assembly is greater than the maximum desired power output by at least a sum of the maximum rated power outputs of at least two of the plurality of fuel cell stacks.

7. The fuel cell system of claim 4, wherein each of the fuel cell stacks has a maximum rated power output that is at least as great as the maximum desired power output.

8. The fuel cell system of claim 1, wherein the fuel cell stack assembly has a plurality of operational states that include at least a first operational state in which all of the fuel cell stacks are receiving at least a portion of the product hydrogen stream from the fuel processing assembly and producing an electric current therefrom, a second operational state, in which none of the fuel cell stacks are producing an electric current, and a third operational state, in which at least one of the plurality of fuel cell stacks is receiving at least a portion of the product hydrogen stream from the fuel processing assembly and producing an electric current therefrom, and at least one of the plurality of fuel cell stacks is not producing an electric current.

9. The fuel cell system of claim 8, wherein in the third operational state, the fuel cell stack assembly is adapted to produce an electric current sufficient to satisfy the applied load.

10. The fuel cell system of claim 8, wherein in the third operational state, the fuel cell stack assembly is adapted to produce an electric current sufficient to satisfy an applied load that corresponds to a maximum desired power output of the fuel cell stack assembly.

11. The fuel cell system of claim 8, wherein in the third operational state, the fuel cell stack assembly is adapted to produce an electric current sufficient to satisfy an applied load that exceeds a maximum desired power output of the fuel cell stack assembly.

12. The fuel cell system of claim 1, wherein the fuel cell system further includes means for limiting the magnitude of the applied load.

13. The fuel cell system of claim 1, wherein the fuel cell system further includes means for selectively delivering at least one of a portion of the product hydrogen stream, an air stream and a cooling fluid stream to the plurality of fuel cell stacks.

14. The fuel cell system of claim 1, wherein the fuel cell system further includes means for regulating the current produced by the fuel cell stack assembly.

15. The fuel cell system of claim 1, wherein the fuel cell system further includes a power management module adapted to receive the electric current produced by the fuel cell stack assembly and to produce an output current therefrom.

16. The fuel cell system of claim 15, wherein the power management module includes a DC-DC converter adapted to selectively regulate the voltage of the current.

17. The fuel cell system of claim 16, wherein the converter is adapted to receive the current from the fuel cell stack assembly and to regulate the current to produce a current having a predetermined voltage.

18. The fuel cell system of claim 16, wherein the converter is adapted to increase the voltage of the current.

19. The fuel cell system of claim 16, wherein the converter is adapted to decrease the voltage of the current.

20. The fuel cell system of claim 15, wherein the power management module includes at least one inverter adapted to convert the current produced by the fuel cell stack assembly to an AC current.

21. The fuel cell system of claim 15, wherein the power management module includes a battery assembly adapted to receive and selectively store at least a portion of the current produced by the fuel cell stack assembly.

22. The fuel cell system of claim 21, wherein the battery assembly includes at least one battery and at least one charger.

23. The fuel cell system of claim 1, wherein the controller is further adapted to regulate the operational states of the plurality of fuel cell stacks responsive at least in part to the flow rate of the product hydrogen stream.

24. The fuel cell system of claim 1, wherein the control system further includes a plurality of sensor assemblies associated with each of the fuel cell stacks, and further wherein the controller is further adapted to regulate the operational states of the plurality of fuel cell stacks responsive at least in part to inputs from the sensor assemblies.

25. The fuel cell system of claim 1, wherein the fuel cell system includes a plurality of contactors, wherein each of the fuel cell stacks is associated with one of the plurality of contactors, and further wherein each of the plurality of contactors includes a plurality of operational states that include at least a first operational state, in which the corresponding fuel cell stack is isolated from the applied load, and a second operational state, in which the corresponding fuel cell stack is not isolated from the applied load.

26. The fuel cell system of claim 25, wherein the controller is in communication with the plurality of contactors and adapted to selectively control the operational states of the contactors.

27. The fuel cell system of claim 1, wherein the fuel cell system includes a manifold assembly adapted to receive at least a portion of the product hydrogen stream and to selectively distribute the portion of the product hydrogen stream to the plurality of fuel cell stacks.

28. The fuel cell system of claim 27, wherein the controller is adapted to selectively regulate the operational states of the plurality of fuel cell stacks, and further wherein the controller communicates with the manifold assembly to selectively regulate the distribution of the product hydrogen stream between the plurality of fuel cell stacks.

29. The fuel cell system of claim 28, wherein the manifold assembly is further adapted to receive an air stream from an air delivery system and to selectively distribute the air stream to the plurality of fuel cell stacks, and further wherein the controller is adapted to selectively regulate the distribution of the air stream to the plurality of fuel cell stacks.

30. The fuel cell system of claim 27, wherein the manifold assembly is further adapted to receive an air stream from an air delivery system and to selectively distribute the air stream to the plurality of fuel cell stacks.

31. The fuel cell system of claim 30, wherein the controller is adapted to selectively regulate the distribution of the air stream by the manifold assembly to the plurality of fuel cell stacks.

32. The fuel cell system of claim 27, wherein the manifold assembly is further adapted to receive a cooling fluid stream from a cooling fluid delivery system and to selectively distribute the cooling fluid stream to the plurality of fuel cell stacks.

33. The fuel cell system of claim 32, wherein the controller is adapted to selectively regulate the distribution of the cooling fluid stream by the manifold assembly to the plurality of fuel cell stacks.

34. The fuel cell system of claim 1, wherein the fuel cell system further includes a manifold assembly adapted to receive an air stream from an air delivery system and to selectively distribute the air stream to the plurality of fuel cell stacks.

35. The fuel cell system of claim 34, wherein the manifold assembly is further adapted to only distribute the air stream to the fuel cell stacks that are in their first operational state.

36. The fuel cell system of claim 34, wherein the controller is in communication with the manifold assembly, and further wherein the controller is adapted to regulate the distribution of the air stream to the fuel cell stacks.

37. The fuel cell system of claim 1, wherein the fuel cell system further includes a manifold assembly adapted to receive a cooling fluid stream from a cooling fluid delivery system and to selectively distribute the cooling fluid stream to the plurality of fuel cell stacks.

38. The fuel cell system of claim 37, wherein the controller is in communication with the manifold assembly, and further wherein the controller is adapted to regulate the distribution of the cooling fluid stream to the fuel cell stacks.

39. The fuel cell system of claim 1, wherein the controller is further adapted to selectively limit the magnitude of the applied load.

40. The fuel cell system of claim 39, wherein the control system is adapted to regulate the magnitude of the applied load responsive at least in part to the sum of the maximum rated power outputs of the fuel cell stacks in the fuel cell stack assembly.

41. The fuel cell system of claim 39, wherein the control system is adapted to regulate the magnitude of the applied load responsive at least in part to the sum of the maximum rated power outputs of the fuel cell stacks that are in their first operational state.

42. The fuel cell system of claim 1, wherein the fuel cell system includes an energy-consuming device adapted to apply at least a portion of the applied load to the fuel cell stack assembly.

43. The fuel cell system of claim 42, wherein the energy-consuming device includes a plurality of devices that are each adapted to apply a portion of the applied load, wherein each of the plurality of devices has a plurality of operational states that include at least a first operational state, in which the device is applying a portion of the applied load, and a second operational state, in which the device is not applying a portion of the applied load.

44. The fuel cell system of claim 43, wherein each of the plurality of devices includes a switching module and further wherein the switching modules are adapted to communicate with each other to regulate the operational states of the devices.

45. The fuel cell system of claim 44, wherein each of the plurality of devices has a priority relative to the rest of the plurality of devices, and further wherein the switching modules are adapted to selectively control the operational states of the devices responsive at least in part to the priority of the devices.

46. The fuel cell system of claim 1, wherein each of the fuel cell stacks includes a plurality of fuel cells.

47. The fuel cell system of claim 1, wherein each of the fuel cell stacks includes a plurality of fuel cells connected between common end plates.

48. The fuel cell system of claim 1, wherein the system further includes an air delivery system adapted to deliver air streams to each of the fuel cell stacks.

49. The fuel cell system of claim 1, wherein the system further includes a cooling fluid delivery system adapted to deliver a cooling fluid stream to each of the fuel cell stacks.

50. The fuel cell system of claim 1, wherein each of the fuel cell stacks is in fluid communication with a cooling fluid delivery system adapted to deliver a cooling fluid stream to a respective one of the fuel cell stacks.

51. The fuel cell system of claim 1, wherein the fuel processing assembly includes at least one fuel processor.

52. The fuel cell system of claim 1, wherein the fuel processing assembly includes at least one steam reformer.

53. The fuel cell system of claim 1, wherein the controller is adapted to select which of the at least one of the plurality of fuel cell stacks is to be configured from the first operational state to the second operational state responsive at least in part to a predetermined sequence.

54. The fuel cell system of claim 1, wherein the controller is adapted to select which of the at least one of the plurality of fuel cell stacks is to be configured from the first operational state to the second operational state responsive at least in part to a rotationally selected sequence.

55. The fuel cell system of claim 1, wherein the controller is adapted to select when the at least one of the plurality of fuel cell stacks is to be configured from the first operational state to the second operational state responsive at least in part to a predetermined time sequence.

* * * * *